Feb. 7, 1939.  C. L. LEE  2,146,304
SPEED SIGNALING MEANS FOR AUTOMOTIVE VEHICLES
Filed Oct. 15, 1936

INVENTOR
CLARENCE L. LEE
BY Edwin Levisohn
ATTORNEY

Patented Feb. 7, 1939

2,146,304

UNITED STATES PATENT OFFICE 2,146,304

SPEED SIGNALING MEANS FOR AUTOMOTIVE VEHICLES

Clarence L. Lee, New York, N. Y.

Application October 15, 1936, Serial No. 105,728

2 Claims. (Cl. 200—56)

The present invention relates to signaling devices for automobiles or other automotive vehicles and is more particularly concerned with a speedometer having provision for calling the driver's attention to the fact that the speed of the vehicle has reached or is about to reach the maximum lawful speed.

It is well known that many automobile drivers violate the speed regulations unconsciously due very often and among things to the fact that in their anxiety to watch the road they fail to observe the speed indications of an ordinary speedometer. The main object of the present invention is to provide a speedometer with means which, when a predetermined speed of the vehicle is reached, will actuate one or more prominent signals, either visual or audible, or both, thereby to warn the operator of the vehicle that the maximum lawful speed thereof is about to be reached or has been exceeded.

As speed limits vary considerably in different localities, it is desirable to provide means for readily setting the additional signaling device so that the maximum lawful speed of any particular locality may be indicated. This constitutes another object of the present invention.

A further important object of this invention is to provide a device of the character described which shall be simple in construction and easy to operate and more particularly so constructed and arranged that the driver of the vehicle may readily set the signal for actuation while he is driving the automobile.

Another object of the invention is to provide signaling means of the character referred to which can be combined with and embodied in the usual speedometers with which automobiles are conventionally equipped, with very little, if any, change in the construction of such speedometers.

The above objects of the invention and other objects ancillary thereto will be more full understood from the following description and the accompanying drawing in which the preferred embodiment of the invention is illustrated.

Figure 1:
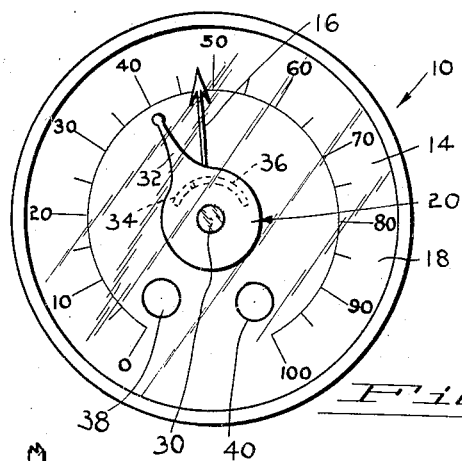
Fig. 1 is a front view in elevation of a speedometer embodying the present invention.
Figure 2:
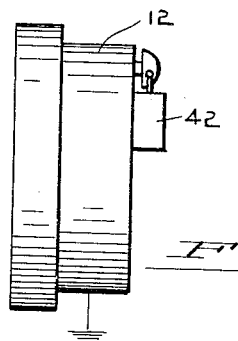
Fig. 2 is a side view thereof in elevation.
Figure 3:
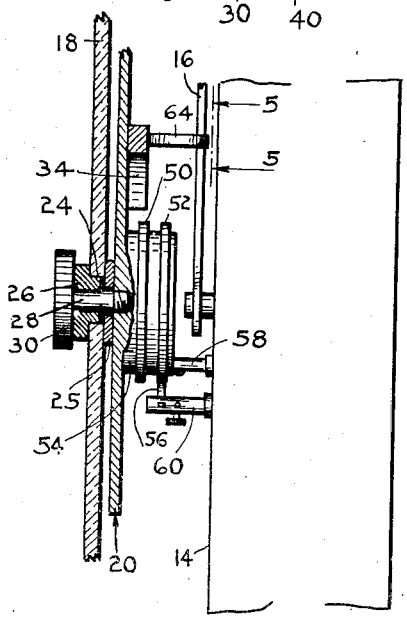
Fig. 3 is a sectional view, partly in elevation, on the line 3—3 of Fig. 4.
Figure 4:
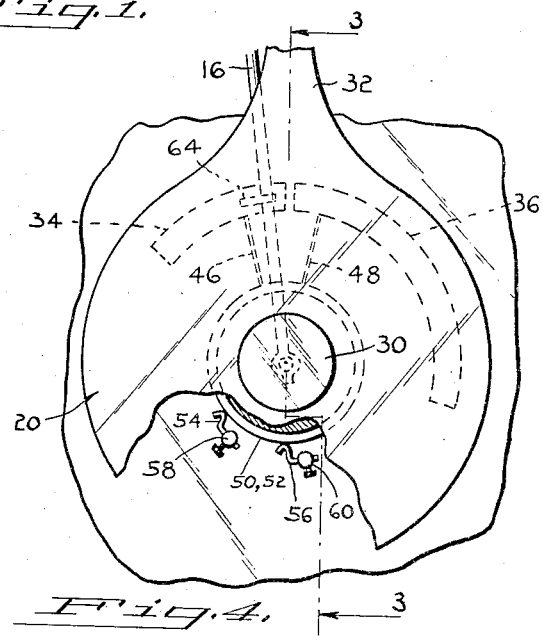
Fig. 4 is a front view of the setting member, part thereof being broken away for the sake of clearness in illustration.
Figure 5:
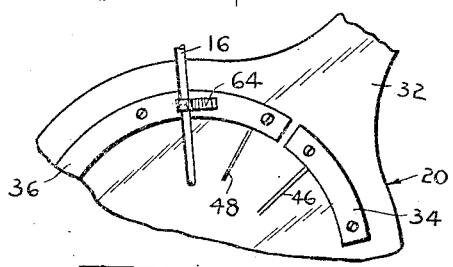
Fig. 5 is a fragmentary rear elevational view on line 5—5 of Fig. 3.

Referring to the drawing in detail, the speedometer 10 in which the present invention is embodied may be of any well known construction and, as here shown, is of a type now in wide use on automobiles. Said speedometer comprises the casing 12 within which the usual speed responsive mechanism is contained and which is provided with a dial 14 calibrated in speed units and over which there moves a pointer 16 actuated by and under the control of the speed responsive mechanism for indicating the speed of the vehicle. A glass or other transparent cover 18 is, as usual, mounted in the front of the casing. The speedometer may be mounted on the dashboard in the usual manner.

The device associated with the speedometer in accordance with the present invention whereby a prominent signal is actuated when a predetermined vehicle speed is reached, comprises a movable member 20 positioned internally of the casing 12 between the dial and glass cover therefor and which is operable from a point externally of the casing, here shown as at the front thereof adjacent said glass cover. For this purpose the glass cover 18 is provided with a centrally disposed opening 24 in which there is mounted a bushing 26 forming a bearing for the shank 28 of a knob 30. Said shank is connected to said member 20 whereby the latter may be adjusted by rotating said knob. Said member is provided with a pointer portion 32 which cooperates with the dial 14 for setting said member at a predetermined speed indication of the dial. The friction between the movable parts is sufficient to maintain the member 20 in the position to which it is set by operation of the knob 30. A fibre or other suitable washer 25 is positioned between and in contact with the cover 18 and the member 20 and thereby holds the latter in proper and fixed spaced relation with respect to the dial 14. The portion of the cover 18 in contact with the bushing 26 may be roughened to provide the necessary friction or the bushing 26 may be made in two parts provided with flanges in contact with the outer and inner surfaces respectively of the cover 18, the washer 25 engaging the inner part of the bushing.

Figure 6:
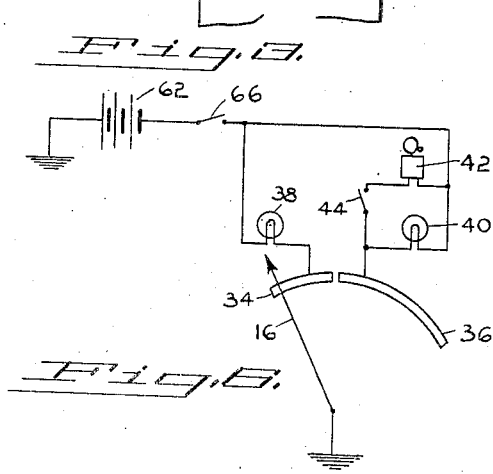
Fig. 6 is a diagram of the signal circuit.

The member 20 is composed of any suitable insulation material, such as Bakelite, and carries on its inner surface spaced contact segments 34 and 36, which are insulated from each other. The segment 34 is electrically connected to an electrical signal, here shown as an electric lamp 38, and the segment 36 is connected to an electric signal, here shown as an electric lamp 40 and an electric bell 42 in parallel relation, through a switch 44 (Fig. 6). The lamps 38 and 40 may be mounted in the speedometer casing in any suitable manner so as to be visible through the glass cover 18. Said bell is, as here shown, mounted on the casing 12 at the rear thereof.

The segments 34 and 36 are connected by wires 46 and 48 to conducting rings 50 and 52, respectively, mounted on a hub portion 54 of the member 20. Said rings 50 and 52 are connected to the signals 38 and 40, 42 by brushes 54 and 56 carried by posts 58 and 60, respectively, which are connected to one side of the signal circuits. Said posts are insulated from each other and from the speedometer casing. The other sides of said circuits are connected to a source of electrical energy such as the automobile battery 62 at the positive terminal thereof, the other terminal of said battery being grounded to the vehicle frame as in the usual construction. The member 20 is arranged in juxtaposition to the speedometer pointer 16 whereby the latter is engageable successively with the contact segments 34 and 36 to complete the signal circuits when the pointer reaches the portion of the dial corresponding to the setting of the member 20 as indicated by its pointer 32. Said speedometer pointer 16 is, as shown, made of metal and in accordance with the present invention is connected to ground through the speedometer casing, the latter being connected to ground and thereby to the signal circuit. Said pointer carries the contact member 64 which is arranged to bear lightly on the contact segments 34 and 36 when said pointer reaches the speed range defined by said contact segments. The connection of the signal circuit to the battery 62 may, if desired, be controlled by a switch 66, which may be mounted on the vehicle dash.

The operation of the device is believed to be obvious from the foregoing description, but briefly, it is as follows: When it is desired to utilize the signaling device of the present invention, the switch 66 is closed and the member 20 is adjusted by means of the knob 30 to position the pointer 32 for indicating the predetermined speed at which the signal is desired. The member 20 is so set and the advance contact segment 34 is preferably of such arcuate length that when the pointer 16 approaches the indication of the maximum lawful speed, say five miles below said maximum speed, indicated by the pointer 32, said contact element 34 will be engaged by the pointer and the circuit will be completed through the signal 38 thereby warning the driver that the speed of the vehicle is approaching the maximum lawful speed of that particular locality for which the device has been set. The driver may then reduce the speed of the vehicle or may take care not to exceed the speed or range of speed indicated by the signal 38. If, however, the driver should exceed the speed or range of speed indicated by the signal 38, the pointer 16 will engage the contact segment 36 and will thereby complete the circuit through the signal 40, 42 which by the character thereof will serve to warn the driver that he has exceeded the lawful speed limit. The segment 36 is of considerable arcuate length so that the signal will continue for a substantial speed range above said predetermined maximum. Preferably, the signal 38 comprises an electric light of orange color to distinguish the same from the maximum speed or danger signal 40 which preferably comprises a red light. The red light and the sounding of the bell will serve to emphatically warn the driver that he is exceeding the speed limit.

Thus it is seen that the construction herein shown and described is well adapted to accomplish the several objects of the present invention. While said construction has been illustrated as the preferred embodiment of the invention, it will be understood that the invention is capable of other embodiments and that certain changes of the construction and arrangement of parts may be made in the preferred embodiment illustrated herein. Therefore, I do not wish to be limited precisely to the present disclosure except as may be required by the appended claims considered with reference to the prior art.

Having thus described my invention, what I claim and desire to secure by Letters Patent is:

1. In a vehicle speedometer comprising a casing within which the speed responsive mechanism, speed indicating dial, and the speedometer pointer actuated by said mechanism are contained and which includes a transparent cover over said dial and pointer, a movable member comprising a hub portion and a radial portion mounted in said casing between said dial and cover, a plurality of contact elements carried by said radial portion and insulated from each other, a plurality of contact members disposed peripherally of and carried by said hub portion and positioned between said dial and said transparent cover, said contact members being insulated from each other and each connected to one of said contact elements, respectively, said speedometer pointer engageable successively with said contact elements for making electrical connections therewith upon a predetermined vehicle speed and a higher speed while said member remains stationary, stationary terminal members within said casing insulated from each other and each having an electrical connection with one of said contact members in relatively movable relation thereto, and means connected to said movable member and operable externally of the casing through said transparent cover for setting said member to position said contact elements for engagement by said speedometer pointer when the latter moves to points on the dial corresponding to said predetermined and higher speeds of the vehicle.

2. In a vehicle speedometer comprising a casing within which the speed responsive mechanism, speed indicating dial, and the speedometer pointer actuated by said mechanism are contained and which includes a transparent cover over said dial and pointer, a movable member mounted in said casing and carrying a plurality of electric contact elements insulated from each other and positioned in front of said dial adjacent said pointer, said speedometer pointer being engageable with said contact elements in succession upon a predetermined speed of the vehicle and upon a higher vehicle speed, respectively, for making electrical connections with said elements at said speeds, stationary terminal members disposed in said casing, and contact members carried by and movable with said movable member having an electric connection with said contact elements and with said terminal members in relatively movable relation to the latter, and means connected to said movable member and operable externally of the casing for setting said member to position said contact elements for engagement by said speedometer pointer when the latter moves to points on the dial corresponding to said predetermined and higher speeds of the vehicle.

CLARENCE L. LEE.